No. 659,114. Patented Oct. 2, 1900.
A. VOORHIES.
COTTON PICKER'S SHADE.
(Application filed July 6, 1900.)
(No Model.) 2 Sheets—Sheet 2.
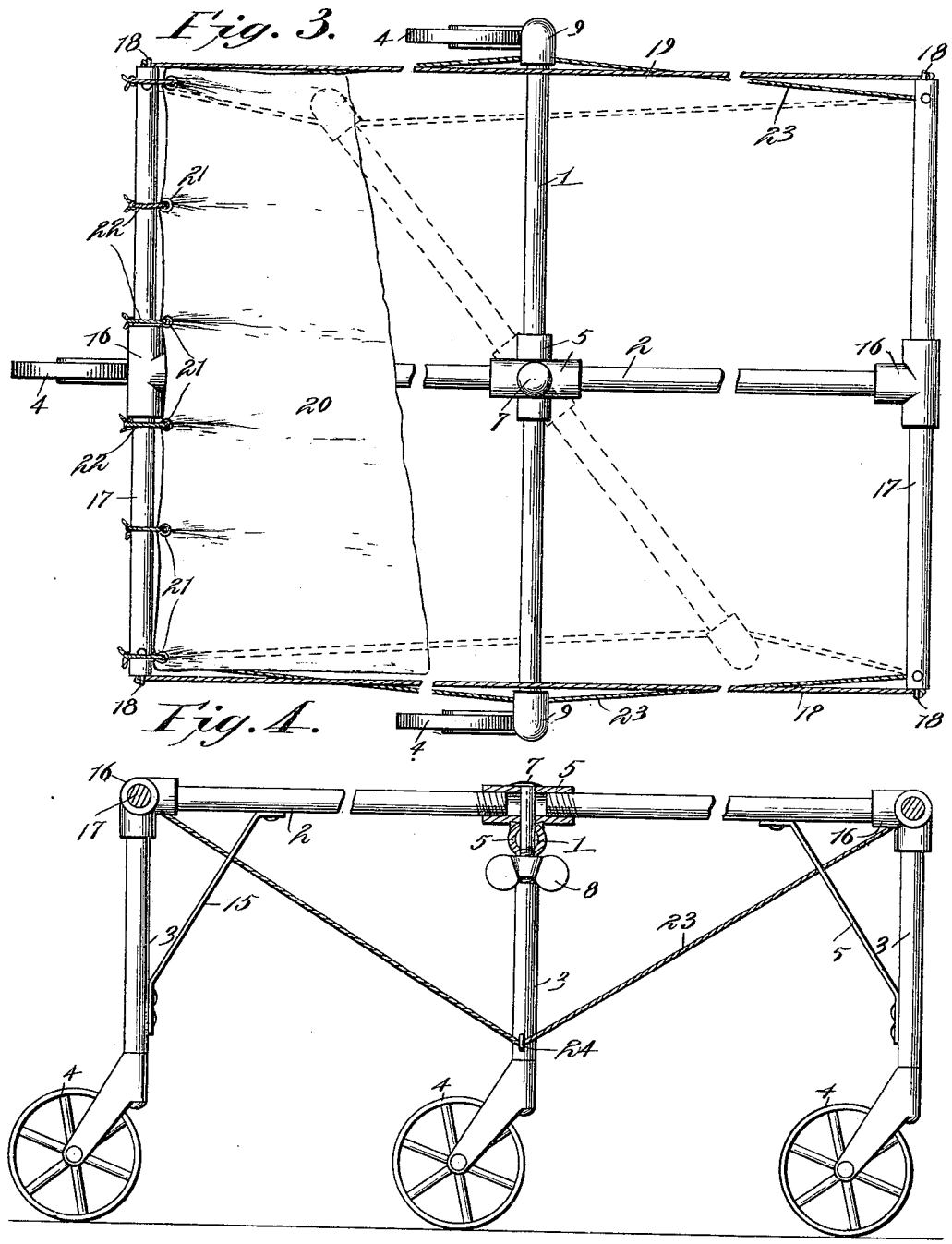

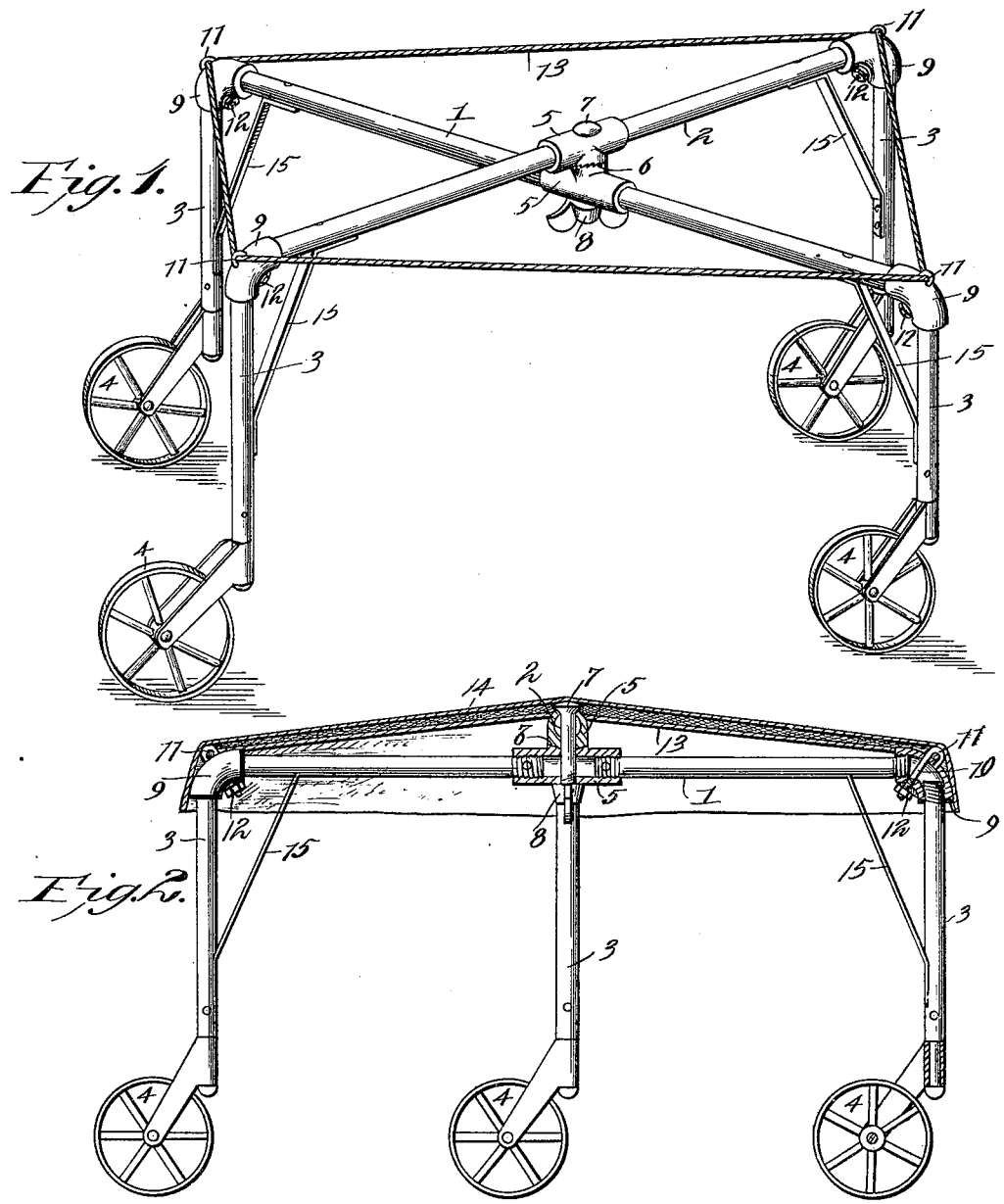

UNITED STATES PATENT OFFICE.

ALEXIS VOORHIES, OF NEW IBERIA, LOUISIANA.

COTTON-PICKER'S SHADE.

SPECIFICATION forming part of Letters Patent No. 659,114, dated October 2, 1900.

Application filed July 6, 1900. Serial No. 22,712. (No model.)

*To all whom it may concern:*

Be it known that I, ALEXIS VOORHIES, a citizen of the United States, residing at New Iberia, in the parish of Iberia and State of Louisiana, have invented a new and useful Cotton-Picker's Shade, of which the following is a specification.

This invention relates to shades for cotton-pickers, and has for its object to provide an improved device of this character which is portable, so that it may be moved along the rows of cotton to protect the picker from the rays of the sun. It is furthermore designed to provide an improved form of frame which may be conveniently taken apart for shipment and storage, also folded to pass through narrow gateways, and adjusted to accommodate the device to rows of different widths.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of the frame of the improved shade. Fig. 2 is a sectional elevation thereof, taken in the plane of one of the cross-bars. Fig. 3 is a top plan view of a modified arrangement of the cover of the device. Fig. 4 is a longitudinal sectional elevation thereof.

Corresponding parts are designated by like characters of reference in all of the figures of the drawings.

Referring to the accompanying drawings, it will be seen that the frame of the device comprises the crossed frame-bars 1 and 2, which are provided at their opposite ends with the pendent standards 3, having caster-wheels 4 at their lower ends, so that the device may be conveniently pushed along the rows of cotton as the picker proceeds with his work. Each cross-bar is formed by two lengths of metal pipe, as best shown in Fig. 2, which are connected by means of a short tubular coupling 5, which has its opposite ends interiorly screw-threaded for the reception of the correspondingly-screw-threaded inner ends of the opposite pipe-sections. These couplings are preferably substantially T-shaped, the lower of which is inverted, so that the outer ends of the vertical branches thereof may lie in contact, and are provided with intermeshed teeth, as indicated at 6 in Fig. 1, so as to prevent accidental turning of the couplings one upon the other. The couplings are furthermore connected by means of a clamping pivot bolt or pin 7, which passes downwardly through the vertical branches of the couplings and is provided with a winged nut 8 upon its lower projecting end, so as to draw the couplings together, and thereby insure a tight intermesh of the teeth thereof, whereby the crossed bars are securely connected and may be adjusted to assume any desired angle, according to the width of the rows upon which the shade is to be used, and the frame may be folded for shipment or for passing through narrow gateways.

At the outer end of each cross-bar there is provided an elbow 9, which has its opposite ends interiorly screw-threaded for the reception of the adjacent cross-bar and the adjacent standard, respectively. Extending loosely and transversely through the elbow and between the adjacent ends of the cross-bar and the standard is a bolt 10, which has its upper end bent into a substantially U-shaped hook 11, the extremity of which is loosely received within a suitable perforation in the outer side of the elbow. The opposite end of the bolt is screw-threaded and projects at the inner side of the frame and is provided with a suitable nut 12, whereby the hooked end of the bolt may be drawn downwardly toward the elbow. An endless brace rope or cable 13 passes through the hooked portions of the several bolts 10, and the nuts 12 are tightened, so as to bind the hooked portions 11 against the rope, so as to fix the latter at different points, and thereby relieve the central adjustable connection of the frame members of considerable strain. Any suitable waterproof covering or canopy 14 is stretched over the frame and the brace-rope and secured thereto in any suitable manner. Each standard is furthermore connected to the adjacent cross-bar by means of a brace-rod 15.

In the form of the device shown in Figs. 3 and 4 the upper cross-bar 2 is preferably the longer and is provided at opposite ends with four-way couplings 16, the standards being connected to the pendent branches thereof. A wooden bar 17 is passed through the alined horizontal branches of each coupling, and the opposite ends thereof are provided with suitable eyes 18, to which are connected the opposite ends of the respective longitudinal brace ropes or cables 19. The cover or canopy 20 is formed of any suitable waterproof material and has its opposite ends provided with a series of rings or gromets 21, through which are passed short strands of ropes 22, which are fastened about the adjacent end bars of the frame. By this arrangement of parts the cross-bar 1 is entirely independent of the other cross-bar, so far as the brace-cable is concerned, in order that the former bar may be conveniently swung or adjusted upon the central connection, so as to accommodate its opposite wheels to rows of different widths without unfastening or interfering with other parts of the device.

The outer ends of the cross-bar 1 of the form shown in Figs. 3 and 4 are braced by means of the opposite brace ropes or cables 23, which have their opposite ends fixedly connected to the corresponding ends of the opposite end bars 17, the intermediate portion of each brace passing through a hooked or U-shaped fastening 24, similar to the fastening 11, (shown in Figs. 1 and 2,) said fastening being preferably located adjacent to the lower end of the adjacent standard of the bar 1. It will of course be understood that this fastening may be loosened, so as to permit of the adjustment of the cross-bar, as indicated in Fig. 3, and then tightened to firmly brace the bar in all positions thereof.

From the foregoing description it will be seen that the present invention provides an exceedingly light and durable canopy-frame, which is mounted upon caster-wheels, so that it may be conveniently pushed along by the picker, who works beneath the shade of the canopy; also, the frame is adjustable to accommodate the device to rows of cotton of different widths and to collapse the frame for storage and shipment and to enable the device to pass through narrow gateways. While the shade has been primarily designed and described as a cotton-picker's shade, it is obvious that it may be used for picking any kind of fruit or vegetables and to provide a portable shade and protection from the weather for use under various circumstances.

What is claimed is—

1. A portable canopy or shade, comprising crossed frame-bars, having wheeled supports, an adjustable connection for the crossed portions of the bars, and a cover for the frame.

2. A portable canopy or shade, comprising crossed frame-bars, having wheeled supports, an adjustable clamping pivotal bolt connecting the intersecting portions of the bars, and a cover for the frame.

3. In a portable canopy or shade, a frame, comprising crossed bars, each of which is formed by opposite pipe-sections, and an intermediate T-coupling, the lower coupling being inverted, and the outer ends of the vertical branches of the two couplings being toothed and intermeshed, and an adjustable clamping-bolt passing through the vertical branches of the couplings, standards at the opposite ends of the crossed bars, wheels at the lower ends of the standards, and a cover stretched over the crossed bars.

4. A portable canopy or shade, comprising crossed frame-bars, having an adjustable pivotal connection at their intersection, wheeled supports for the opposite ends of the bars, a brace-cable for the bars, and a cover stretched over the frame.

5. A portable canopy, comprising crossed frame-bars, wheeled supports for the bars, bolts passing loosely through the supports, one end of each bolt being provided with a rebent hook, the extremity of which is received within a perforation in the frame, a nut for the opposite end of the bolt, a cable-brace held within the hooked portions of the bolts, and a cover for the frame.

6. A portable canopy or shade, comprising crossed and pivotally-connected frame-bars, standards at the outer ends of the bars, caster-wheels carried by the standards, and a cover stretched over the frame.

7. A portable canopy or shade, comprising pivotally-connected crossed frame-bars, wheeled supports for the opposite ends of the respective bars, end bars at the opposite ends of one of the crossed bars, and a cover connected to the end bars only.

8. A portable canopy or shade, comprising pivotally-connected crossed frame-bars, wheeled supports for the opposite ends of the bars, transverse end bars at the opposite ends of one of the crossed bars, cable-braces between respective ends of the opposite end bars, and a cover, having detachable connections at opposite ends with the respective end bars only.

9. A portable canopy or shade, comprising crossed and pivotally-connected frame-bars, four-way couplings at the opposite ends of one of the bars, wheeled standards connected to the pendent branches of the respective couplings, and other wheeled standards connected to the opposite ends of the other crossed bar, transverse end bars passed through the horizontal branches of the respective couplings, cable-braces between the respective ends of the opposite end bars, and a cover detachably connected to the end bars only.

10. A portable canopy and shade, comprising crossed and pivotally-connected frame-bars, wheeled standards at the opposite ends of the frame-bars, transverse end bars at opposite ends of one of the frame-bars, flexible braces extending from corresponding ends of the opposite end bars, adjustable fastenings carried by the standards of the other frame-bar and adjustably receiving the intermediate portions of the respective braces, whereby the frame-bars may be adjusted upon their pivotal connection, and a cover fitted over the device.

In testimony that I claim the foregoing as my own I have hereto affixed my signature in the presence of two witnesses.

ALEXIS VOORHIES.

Witnesses:
S. THOMAS,
C. L. PROVOST.